United States Patent [19]

Lupatin

[11] 4,090,228
[45] May 16, 1978

[54] PROTECTIVE DEVICE FOR A SYSTEM FEEDING A BALANCED LOAD FROM A REMOTE POWER SUPPLY

[75] Inventor: Elio Lupatin, Settimo Milanese (MI), Italy

[73] Assignee: Societa Italiana Telecomunicazioni Siemens S.p.A., Milan, Italy

[21] Appl. No.: 747,049

[22] Filed: Dec. 2, 1976

[30] Foreign Application Priority Data

Dec. 3, 1975 Italy .................. 29942 A/75

[51] Int. Cl.² .................. H02H 3/24; H02H 3/20
[52] U.S. Cl. .................. 361/86; 307/130; 361/59; 361/110
[58] Field of Search .............. 361/91, 88, 110, 111, 361/59, 71, 79, 86, 94, 98, 42, 49; 307/127, 130, 355; 328/151, 154

[56] References Cited

U.S. PATENT DOCUMENTS 3,885,199   5/1975   Nohara et al. .................. 361/79

Primary Examiner—Patrick R. Salce
Attorney, Agent, or Firm—Karl F. Ross

[57] ABSTRACT

A system for the floating energization of a balanced load from a remote power supply via a pair of conductors, e.g., for feeding operating currents to repeaters of a telecommunication link, includes a circuit breaker controlled by an open-circuit sensor and an unbalance sensor through a memory unit provided with a pair of storage circuits. These circuits, designed to store a malfunction signal emitted by either of the two sensors until the arrival of a resetting signal, inhibit each other to prevent the registration of more than one malfunction at a time.

12 Claims, 3 Drawing Figures

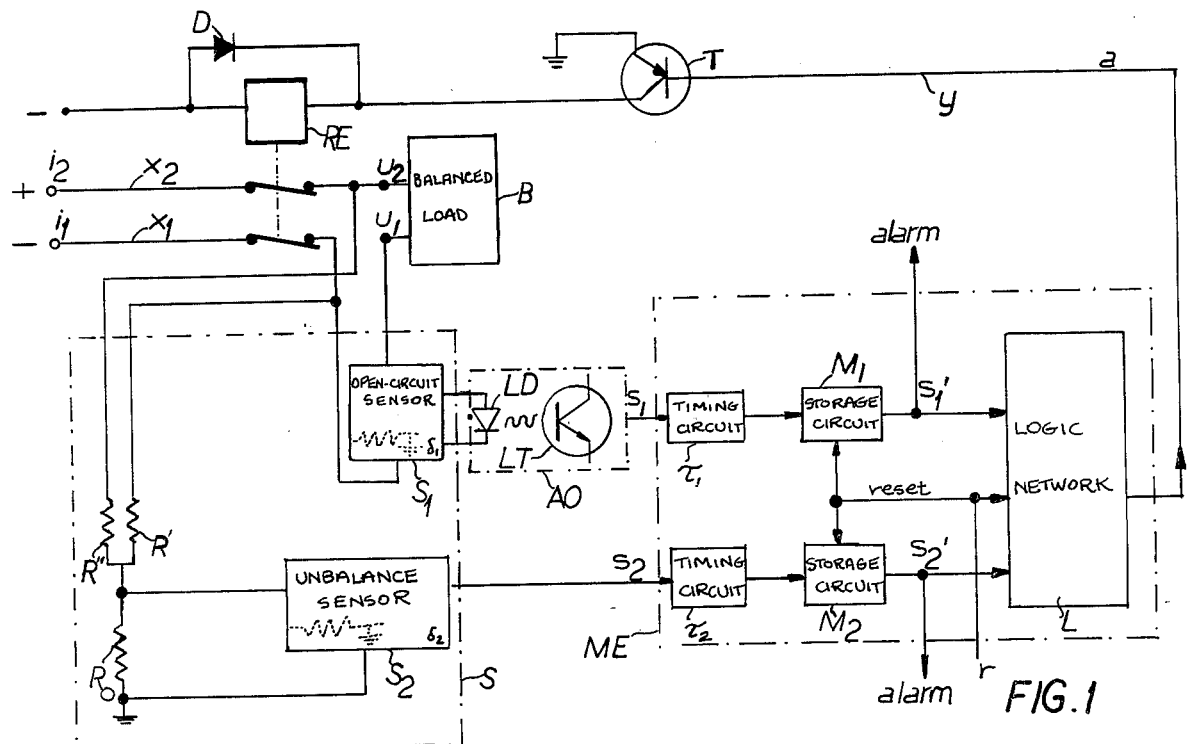
FIG. 1
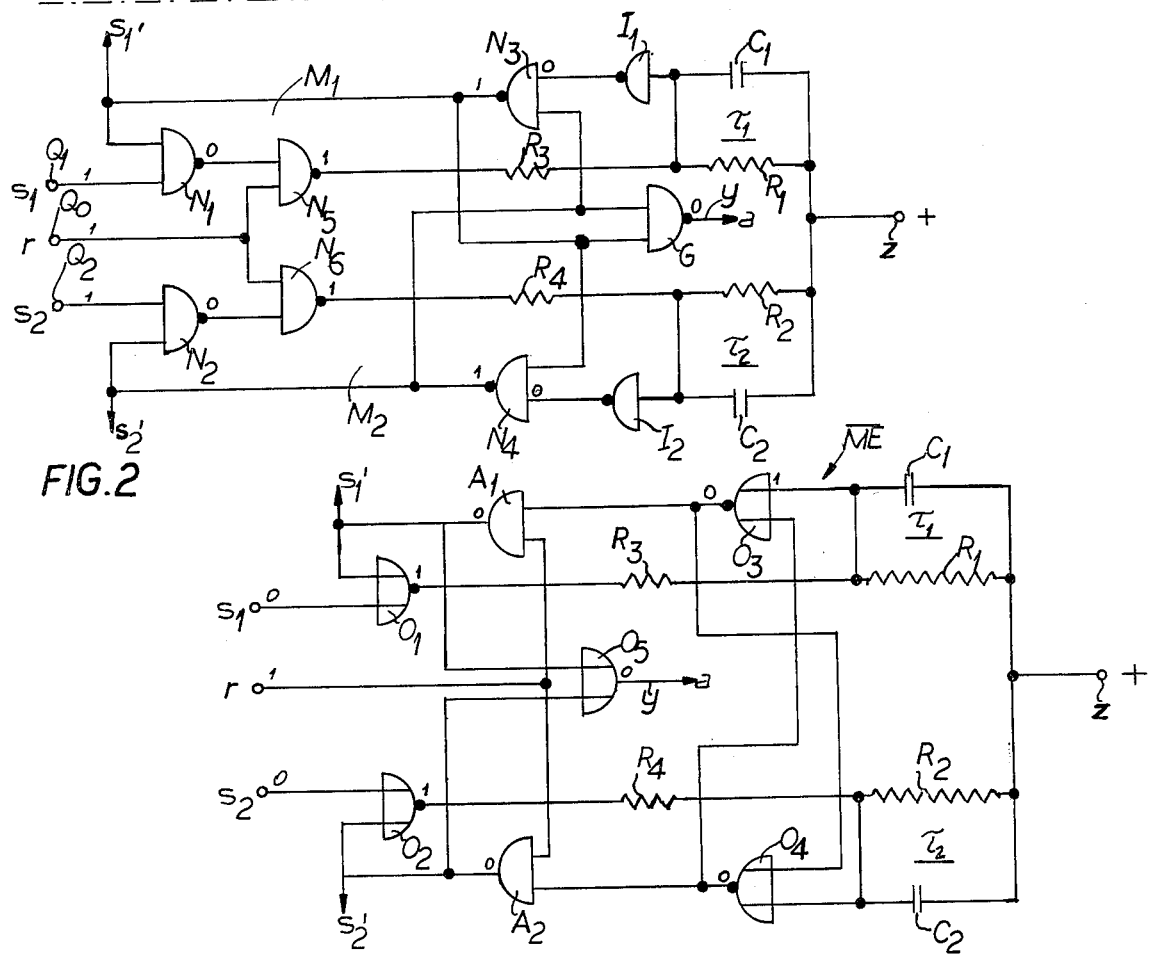
FIG. 2
FIG. 3

PROTECTIVE DEVICE FOR A SYSTEM FEEDING A BALANCED LOAD FROM A REMOTE POWER SUPPLY

FIELD OF THE INVENTION

My present invention relates to a protective device for a system in which power is supplied to a balanced load from a remote source via a two-conductor transmission line.

BACKGROUND OF THE INVENTION

In a telecommunication system, for example, a line link having a pair of coaxial cables for the sending of messages in opposite directions generally includes a number of repeaters whose amplifiers may receive direct or alternating current from one of the terminal stations served by that link. In some of these systems the energizing current is transmitted, under normal operating conditions, in a balanced manner with reference to ground over the line loop formed by the two conductors and the load constituted by the components of the repeater, the loop being insulated from ground at all points whereby the load is held at a floating potential. As long as the symmetry of the circuit is not disturbed, there exists only a small potential difference between the load terminals and ground so that maintenance personnel working at the repeater will not be imperiled.

If an unbalance develops along the line, e.g. on account of a ground fault, that potential difference may become dangerous. This can also be the case when the load is accidentally open-circuited so that a large voltage difference exists across its terminals.

OBJECT OF THE INVENTION

It is, therefore, the object of my present invention to provide a device for the protection of personnel and equipment in such a system from harmful overvoltages due to either of the two malfunctions referred to, i.e., a line unbalance or an open-circuited load.

SUMMARY OF THE INVENTION

A protective device according to my invention includes a first sensor inserted into the line in series with the load for generating a first malfunction signal upon detecting an open-circuit condition and a second sensor connected between ground and a midpoint of the line (as established by a voltage divider bridging its two conductors) upstream of the load for generating a second malfunction signal upon detecting a condition of significant unbalance. The two sensors are operatively coupled to a memory unit which stores either of these malfunction signals independently of the continued existence of the conditions of open circuit or unbalance giving rise to these signals. The stored signals actuate switch means controlled by the memory unit for interrupting both conductors so as to disconnect the load terminals from their power supply.

Aside from interrupting the line conductors, and preferably concurrently therewith, the memory unit may also emit an alarm signal in order to call an operator's attention to the detected malfunction. After repairs have been carried out; or automatically at certain intervals, a resetting signal is sent to the memory unit to restore the continuity of the line conductors if the trouble has been remedied. The circuit breakers used for the interruption of the line conductors in an alarm condition are advantageously located upstream of the two sensors which thereby also become part of the protected equipment.

Since the open-circuiting of the load will usually unbalance the line, and since operation of the circuit breakers upon detection of a ground fault or the like could be interpreted by the open-circuit sensor as an accidental disconnection of the load from its power supply, it is desirable to design the memory unit in such a way that only one kind of malfunction signal at a time can be stored therein in order to avoid confusion as to the kind of trouble that has to be remedied. Thus, pursuant to a further feature of my invention, the memory unit comprises a pair of binary storage circuits with setting inputs respectively connected to the two sensors and with inhibiting cross-connections whereby each storage circuit, upon being set by a malfunction signal from the associated sensors, blocks the setting of the other storage circuit.

The two storage circuits are preferably identical and comprise each a logical feedback loop with a plurality of cyclically interconnected gating stations, three of these stations being formed by coincidence gates of which at least two should be of the inverting type (with an even number of inverters in each feedback loop). Such an inverting coincidence gate, producing in its output a negation of a logical signal applied to both its inputs, can be either a NAND gate or a NOR gate; naturally, it could also be an AND (or OR) gate followed by an inverter as a separate stage.

The setting inputs of the memory unit, receiving the malfunction signals from the two sensors, are tied to one of the three pairs of coincidence gates of the two storage circuits; another such pair is tied to the cross-connections between these circuits while the resetting signal is applied to the third pair.

BRIEF DESCRIPTION OF THE DRAWING

The above and other features of my invention will now be described in detail with reference to the accompanying drawing in which:

FIG. 1 is an overall block diagram of a protective device according to my invention;

FIG. 2 is a more detailed circuit diagram of a memory unit forming part of the device of FIG. 1; and FIG. 3 is a circuit diagram similar to FIG. 2, showing a modified memory unit.

SPECIFIC DESCRIPTION

In FIG. 1 I have shown a pair of conductors $x_1$, $x_2$ with input terminals $i_1$, $i_2$ and output terminals $u_1$, $u_2$, these conductors forming extensions of a pair of line wires of a transmission link not further illustrated. The line wires, which may be constituted by coaxial cables, carry energizing current to a balanced load B which is connected across terminals $u_1$ and $u_2$. From a remote source, not shown, terminals $i_1$ and $i_2$ respectively receive negative and positive voltages which normally are substantially balanced with reference to ground. A relay RE, bridged by a diode D and energized under proper operating conditions from a local power supply through a PNP transistor T, has normally closed circuit-breaker contacts in series with conductors $x_1$ and $x_2$. Transistor T is provided with a normally de-energized base lead $y$.

In accordance with my present invention, a protective device controlling the operation of relay RE comprises a threshold circuit S with an open-circuit sensor $S_1$ in series with lead $x_1$ and an unbalance sensor $S_2$ connected across a resistor $R_o$, the latter lying between ground and a midpoint of the line as determined by a voltage divider consisting of two identical resistors $R'$, $R''$ bridging the conductors $x_1$, $x_2$. Sensor $S_1$, whose impedance should be low compared with that of load B, may comprise a nonillustrated relay, magnetic amplifier or the like detecting the absence of a load current or the diminution of that current below a predetermined level. Sensor $S_2$ may comprise a full-wave rectifier working into a comparator which determines whether the absolute voltage drop across resistor $R_o$ does or does not exceed a predetermined threshold. In order to prevent these sensors from responding to transient voltages insufficient to cause any harm, I prefer to provide them with integrating networks delaying the buildup of a malfunction signal as indicated diagrammatically at $\delta_1$ and $\delta_2$. These malfunction signals consist of changes in the binary values of output signals $s_1$ and $s_2$ which are generated by sensors $S_1$ and $S_2$ and are communicated to a memory unit ME whose output is the lead $y$.

While the unbalance sensor $S_2$ is isolated from possible high line voltage by resistors $R'$ and $R''$, the open-circuit sensor $S_1$ is directly connected to the line and may therefore be at a dangerous potential in the event of trouble. I prefer, accordingly, to insulate sensor $S_1$ galvanically from memory ME by providing a photoelectric coupler AO with two complementary transducers therebetween, i.e., a light-emitting diode LD and a light-responsive transistor LT. Memory unit ME comprises two identical halves diagrammatically represented in FIG. 1 by timing circuits $\tau_1$, $\tau_2$ and storage circuits $M_1$, $M_2$ as well as respective sections of a logic network L. Circuits $M_1$ and $M_2$ are respectively settable by malfunction signals $\bar{s_1}$ and $\bar{s_2}$ from sensors $S_1$ and $S_2$ but are cross-connected, in a manner more fully described hereinafter, to inhibit each other so that only one of them can emit an output signal $\bar{s_1}'$ or $\bar{s_2}'$ to logic network L and to a respective alarm unit not further illustrated. A manually or automatically generated resetting signal $\bar{r}$ is delivered to storage circuits $M_1$, $M_2$ and to network L to cancel a previous trouble-indicating signal $a$ which, in response to alarm signal $\bar{s_1}'$ or $\bar{s_2}'$, energizes the base lead $y$ of transistor T to release the relay RE, thereby open-circuiting the conductors $x_1$ and $x_2$ upstream of sensors $S_1$ and $S_2$.

I shall now refer to FIG. 2 for a more detailed description of memory unit ME. This unit has three input terminals $Q_1$, $Q_2$, $Q_o$ for signals $s_1$, $s_2$ and $r$ as well as a supply terminal $z$ to which a local voltage of binary value "1" (here positive) is applied. The two identical storage circuits $M_1$ and $M_2$ are represented by two sets of NAND gates cyclically interconnected in a pair of feedback loops, i.e., gates $N_1$, $N_3$, $N_5$ in circuit $M_1$, settable by signal $\bar{s_1}$, and gates $N_2$, $N_4$, $N_6$ in circuit $M_2$, settable by signal $\bar{s_2}$. NAND gate $N_1$ receives the incoming signal $s_1$ from terminal $Q_1$ and, from NAND gate $N_3$, the outgoing signal $s_1'$ which signifies an alarm condition upon changing from its normal binary value "1" to "0." In an analogous manner, NAND gate $N_2$ receives the incoming signal $s_2$ from terminal $Q_2$ and, from NAND gate $N_4$, the outgoing signal $s_2'$. NAND gate $N_5$ has one input receiving the signal $r$ from terminal $Q_o$ and another input tied to the output of gate $N_1$; its output is connected, via a resistor $R_3$ and an inverter $I_1$, to one input of gate $N_3$ whose other input is tied to the output of its counterpart $N_4$ in the second storage circuit $M_2$. NAND gate $N_6$, connected to input terminal $Q_o$ and to the output of gate $N_2$, similarly works via a resistor $R_4$ and an inverter $I_2$ into one input of gate $N_4$ whose other input is cross-connected to the output of its counterpart $N_3$ in the first storage circuit $M_1$.

Resistors $R_3$ and $R_4$ form part of timing circuits $\tau_1$ and $\tau_2$, respectively, which also include resistors $R_1$ and $R_2$ connected to terminal $z$ in parallel with capacitors $C_1$ and $C_2$. These timing circuits thus from a pair of delay networks in respective inputs of gates $N_3$ and $N_4$. It will be apparent that gates $N_5$ and $N_6$ could be designed as AND gates rather than NAND gates with elimination of inverters $I_1$ and $I_2$, provided the potential of terminal $z$ were changed from logical "1" to logical "0" (ground).

Gates $N_3$ and $N_4$ may also be considered part of the logic network L of FIG. 1, that network further including a NAND gate G with inputs connected to the outputs of gates $N_3$ and $N_4$. Lead $y$ constitutes the output of gate G.

In the normal operation of the transmission system served by the protective device according to my invention, signals $s_1$, $r$ and $s_2$ as well as $s_1'$ have the logical value "1." A logical "0" then appears in the outputs of gates $N_1$, $N_2$ and of inverters $I_1$, $I_2$ as well as on lead $y$. Gates $N_1$ and $N_2$ are switchable by a disappearance of signals $s_1$ and $s_2$, respectively.

Since the operations of the two storage circuits are identical, it will be sufficient to describe that of circuit $M_1$ including gating stages $N_1$, $N_5$, $I_1$ and $N_3$ as well as delay network $\tau_1$. With the detection of an open circuit by sensor $S_1$, signal $s_1$ goes to zero and inverts all the signals in the several stage outputs. With $s_1' = 0$ the gate $N_1$ becomes unswitchable so that the set condition of the storage circuit is maintained even if signal $s_1$ reverts to its normal value "1." At the same time the logical "0" in the output of gate $N_3$ inhibits the switching of gate $N_4$ in the companion circuit $M_2$ so that the possible emission of a malfunction signal by sensor $S_2$ (disappearance of signal $s_2$) would be ineffectual. It should be noted, however, that alarm signal $\bar{s_1}'$ follows malfunction signal $\bar{s_1}$ only with a certain delay introduced by network $\tau_1$.

With $s_1' = 0$, gate G conducts so that $a = 1$ whereby the contacts of relay RE interrupt the conductors $x_1$ and $x_2$. This condition persists until the resetting signal $\bar{r}$ is changed, i.e., until the terminal $Q_o$ is temporarily de-energized. NAND gate $N_5$ conducts again and, after a delay in network $\tau_1$ (which obviously should be less than the duration of the resetting signal $\bar{r}$), restores signal $s_1'$ to its logical value "1" so that gate $N_1$ ceases to conduct if signal $s_1$ regains its normal value upon reclosure of the relay contacts by the reblocking of NAND gate G. In that instance, the signal voltages of the storage circuit return to their normal values upon the termination of the resetting signal $\bar{r}$.

If the delay of network $\tau_2$ exceeds that of network $\tau_1$, the blocking of storage circuit $M_2$ will occur before that circuit is switched by a signal $\bar{s_2}$ from sensor $S_2$ in response to an unbalance resulting from the open circuit detected by sensor $S_1$. If, on the other hand, circuit $M_2$ is set first by an unbalance signal $\bar{s_2}$, the open-circuit condition brought about by the operation of relay RE will not cause a setting of circuit $M_1$ by a signal $\bar{s_1}$, thanks to the delay introduced by network $\tau_1$.

If all the NAND gates of FIG. 2 were replaced by NOR gates, and if signals $s_1$, $r$ and $s_2$ as well as the supply voltage on terminal $z$ normally had the value "9," the system would operate in an analogous manner except for an inversion of the binary values.

In FIG. 3 I have shown a modified memory unit $\overline{ME}$ with NOR gates $O_1 - O_4$ replacing NAND gates $N_1-N_4$ and AND gates $A_1$ and $A_2$ taking the place of the combination of NAND gates $N_5$ and $N_6$ with inverters $I_1$ and $I_2$. Output gate G of FIG. 2 has been replaced by an OR gate $O_5$. AND gates $A_1$ and $A_2$, receiving the signal $r$, are here inserted in the outputs of NOR gates $O_3$ and $O_4$ to emit the feedback signals $s_1'$ and $s_2'$ which have normally the value "0," as have the input signals $s_1$ and $s_2$. Memory unit $\overline{ME}$ operates otherwise in the same manner as memory unit ME of FIG. 2.

Although I have described my invention with specific reference to open-circuit and unbalance sensors, it will be understood that the disclosed protective device can be used with other types of trouble indicators, especially where it is desired to register only the signal first generated among two or more signals indicating diverse trouble conditions.

I claim:

1. In a system for supplying power to a load from a remote source by way of a normally balanced transmission line having two conductors, the combination therewith of a protective device comprising:
    first sensing means connected to said line for generating a first malfunction signal upon detecting a first trouble condition;
    second sensing means connected to said liine for generating a second malfunction signal upon detecting a second trouble condition;
    memory means operatively coupled to said sensing means for storing a malfunction signal from either of said sensing means independently of the continued existence of the trouble conditions giving rise thereto; and
    switch means controlled by said memory means for interrupting both said conductors in response to a stored malfunction signal, said memory means including a pair of binary storage circuits with setting inputs connected to said first and second sensing means, respectively.

2. The combination defined in claim 1 wherein said first and second sensing means include integrating circuitry for retarding their response.

3. The combination defined in claim 1 wherein said storage circuits are substantially identical and are provided with inhibiting cross-connections whereby each storage circuit set by a malfunction signal from the respective sensing means blocks the setting of the other storage circuit.

4. The combination defined in claim 3 wherein said storage circuits are provided with resetting inputs connected to a common signal source.

5. The combination defined in claim 4 wherein each of said storage circuits comprises a logical feedback loop with a plurality of cyclically interconnected gating stages including three coincidence gates with an even number of inverters, said setting inputs being tied to a first pair of coincidence gates of said loops, said cross-connections being tied to a second pair of coincidence gates of said loops and said resetting inputs being tied to a third pair of coincidence gates of said loops, one of said pairs of coincidence gates having outputs connected to said switch means.

6. The combination defined in claim 5 further comprising a pair of delay networks inserted in said loops.

7. The combination defined in claim 6 wherein said delay networks are inserted in respective inputs of said second pair of coincidence gates.

8. The combination defined in claim 1 wherein said first sensing means is connected in series with said load for detecting an open-circuit condition, said second sensing means being connected between ground and a midpoint of said line upstream of said load for detecting a condition of significant unbalance of said line, said switch means comprising a pair of circuit breakers inserted in said conductors upstream of said first and second sensing means.

9. The combination defined in claim 8 wherein the operative coupling between said first sensing means and said memory means comprises a pair of complementary photoelectric transducers.

10. In a system for supplying power to a load from a remote source by way of a normally balanced transmission line having two conductors, the combination therewith of a protective device comprising:
    first sensing means connected to said line in series with said load for generating a first malfunction signal upon detecting an open-circuit condition;
    second sensing means connected between ground and a midpoint of said line upstream of said load for generating a second malfunction signal upon detecting a significant imbalance of said line;
    memory means operatively coupled to said sensing means for storing a malfunction signal from either of said sensing means independently of the continued existence of the trouble conditions giving rise thereto; and
    switch means controlled by said memory means for interrupting both said conductors in response to a stored malfunction signal, said switch means including a pair of circuit breakers inserted in said conductors upstream of said first and second sensing means.

11. The combination defined in claim 10 wherein the operative coupling between said first sensing means and said memory means comprises a pair of complementary photoelectric transducers.

12. In a system for supplying power to a load from a remote source by way of a normally balanced transmission line having two conductors, the combination therewith of a protective device comprising:
    first sensing means connected to said line for generating a first malfunction signal upon detecting a first trouble condition;
    second sensing means connected to said line for generating a second malfunction signal upon detecting a second trouble condition;
    memory means operatively coupled to said sensing means for storing a malfunction signal from either of said sensing means independently of the continued existence of the trouble conditions giving rise thereto; and
    switch means controlled by said memory means for interrupting both said conductors in response to a stored malfunction signal, said memory means including a pair of substantially identical storage circuits provided with inhibiting cross-connections whereby each storage circuit loaded with a malfunction signal from the respective sensing means blocks the loading of the other storage circuit.

* * * * *